US009770979B2

(12) United States Patent
Cragel et al.

(10) Patent No.: US 9,770,979 B2
(45) Date of Patent: Sep. 26, 2017

(54) OBJECT POSITIONING METHOD

(71) Applicant: Ford Global Technologies, LLC, Dearborn, MI (US)

(72) Inventors: Daniel Frank Cragel, Livonia, MI (US); Mark Edward Hipp, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 14/281,725

(22) Filed: May 19, 2014

(65) Prior Publication Data

US 2015/0328981 A1     Nov. 19, 2015

(51) Int. Cl.
*F02M 37/00* (2006.01)
*B60K 15/077* (2006.01)
*B60K 15/03* (2006.01)

(52) U.S. Cl.
CPC ............ *B60K 15/077* (2013.01); *B60K 15/03* (2013.01); *B60K 2015/0344* (2013.01); *B60K 2015/03453* (2013.01); *B60K 2015/0772* (2013.01)

(58) Field of Classification Search
CPC ................... B60K 2015/03032; F02M 37/0082
USPC .............. 137/565.01, 583, 587, 589, 565.17, 137/565.22, 509; 123/509
See application file for complete search history.

(56) References Cited

U.S. PATENT DOCUMENTS

| 6,260,543 | B1* | 7/2001 | Chih ................... | B01D 35/027 123/509 |
| 6,282,953 | B1 | 9/2001 | Benjey | |
| 6,690,475 | B2 | 2/2004 | Spillman, Jr. et al. | |
| 7,441,455 | B2 | 10/2008 | Vargas Da Silva | |
| 8,291,942 | B2 | 10/2012 | Berardi | |
| 8,291,946 | B2 | 10/2012 | Lim et al. | |
| 2003/0015537 | A1* | 1/2003 | Konja .................. | B60K 15/077 220/563 |
| 2008/0245344 | A1* | 10/2008 | Kuji ..................... | F02M 37/007 123/509 |
| 2010/0237080 | A1 | 9/2010 | Gebert et al. | |
| 2011/0139128 | A1* | 6/2011 | Zhang ................. | F02M 37/103 123/509 |
| 2012/0145132 | A1* | 6/2012 | White .................. | B60K 15/061 123/509 |
| 2012/0234074 | A1 | 9/2012 | Hagen | |

OTHER PUBLICATIONS

Suzuki, K. et al., "A Highly Accurate Fuel Level Measuring System," SAE Technical Paper Series No. 871961, Oct. 19-22, 1989, Nissan Motor Co., Ltd., 12 pages.

* cited by examiner

*Primary Examiner* — Kevin Murphy
*Assistant Examiner* — Paul J Gray
(74) *Attorney, Agent, or Firm* — James Dottavio; McCoy Russell LLP

(57) ABSTRACT

A fuel tank having one or more support domes configured to engage with, and assist in positioning, a fuel tank insert.

6 Claims, 5 Drawing Sheets

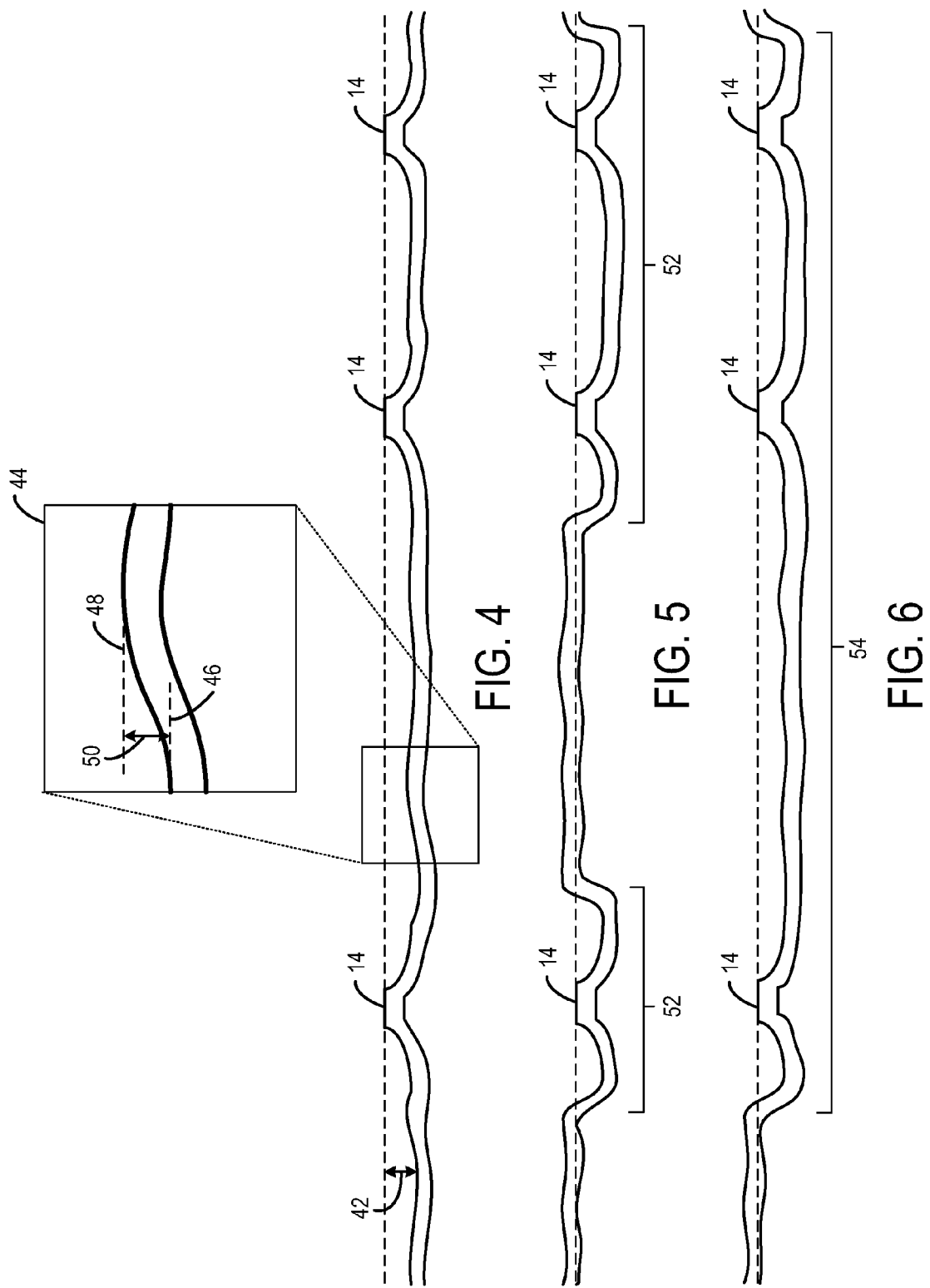

OBJECT POSITIONING METHOD

BACKGROUND AND SUMMARY

Vehicles using combustion engines include a manufactured vessel (e.g., a blow molded fuel tank) to hold the fuel used to fuel engine combustion. Accurate fuel level readings enable a vehicle operator to better manage fuel refilling during vehicle operation.

In order to collect fuel level information, fuel tanks may use a float attached to an arm, where a fuel level measurement module can determine the volume of fuel remaining by the position of the arm and calibrated knowledge of the shape of the fuel tank. However, in cases where the fuel level measurement module is not in the calibrated position, or orientation, the arm position may not indicate the correct fuel level based on the shape knowledge of the fuel tank. Specifically, as taught in US Patent Application Publication No. US 2012/0234074 A1 titled "Measurement device and method for determining a fluid fill level in a fuel tank"; the tilting of components of the measurement device may cause incorrect fill level indications in conventional measurement devices.

Fuel tanks are dimensionally challenging to manufacture. The parralellism requirement for the internal tank bottom surface, underneath the fuel level measurement module, is an important characteristic in how the level sensing float is able to properly gauge the depth of the fuel in the tank—this is especially critical at very low fuel levels. The typical methods of controlling the parralellism of the internal bottom surface of the fuel tank, however, often fail to produce desirable results, potentially leading to unintended, or inaccurate, fuel level indication information being presented to the driver of the vehicle.

Rather than, or in addition to, trying to control the tank bottom surface as an aggregate surface, one example approach has a fuel tank with a bottom inner surface including a first region below a fuel tank insert, the bottom inner surface including a plurality of flat-topped support domes defining a common plane. The bottom surface may further include a second region below a float, the second region including at least one flat-topped support dome further defining the common plane. In this way, the tolerance of the bottom surface can generally be relaxed while maintaining the parralellism, of the domes to a tighter tolerance. Such an approach can reduce overall costs, speed manufacturing, while increasing fuel level measuring.

In one example, a number of discrete small support domes, or peaks, may be provided in the area(s) of interest and contact with other components. The support domes can be raised and lowered via simple tank mold modifications with precision to allow for "tuning in" of the relationship of the fuel reservoir to another feature or area of the tank. This approach frees the majority of the tank bottom surface from strict parralellism, requirements, allowing for improved and accurate fuel level information to be collected along with easier and improved tank manufacturing.

The inventors herein have recognized the issues noted above, as well as the various approaches herein to at least partially address them.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 4 shows a side view depiction of the support domes of FIG. 1.

FIG. 5 shows a side view depiction of the support domes of FIG. 1, where the support domes are located in sumps.

FIG. 6 shows a side view depiction of the support domes of FIG. 1, where the support domes are located in a well.

DETAILED DESCRIPTION

The following description relates to systems and methods for a fuel tank configured with support domes on the bottom surface used to engage with a fuel tank insert, such as a fuel delivery module that includes fuel level measurement components, fuel pump, and various other components. The support domes are configured to provide accurate locating points to provide more consistent fuel level sensing, while preventing the fuel delivery module from contacting the bottom surface of the fuel tank. Such an approach reduces potential for surface irregularities of the bottom surface from influencing the position and/or orientation of the fuel delivery module.

Figure 1:
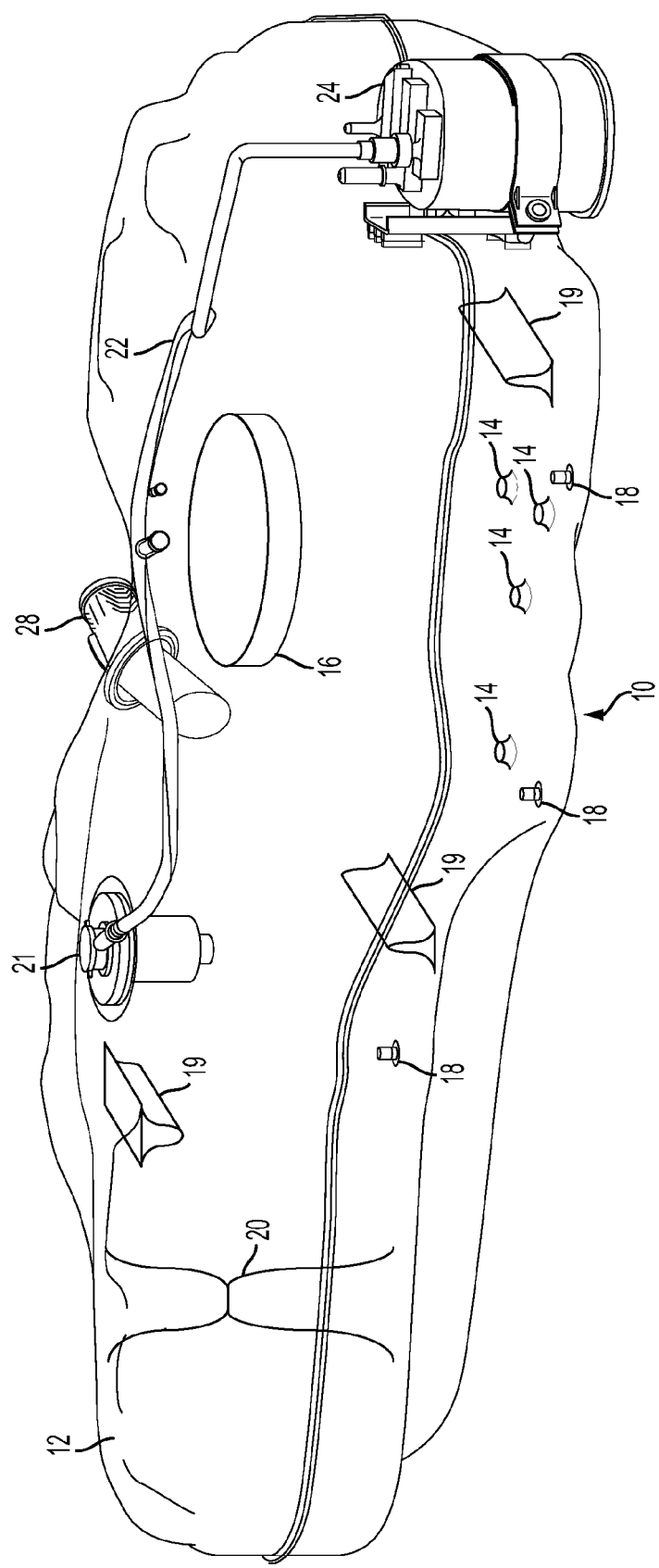
FIG. 1 shows a view of a fuel tank with support domes according to an example of the present disclosure.
Figure 2:
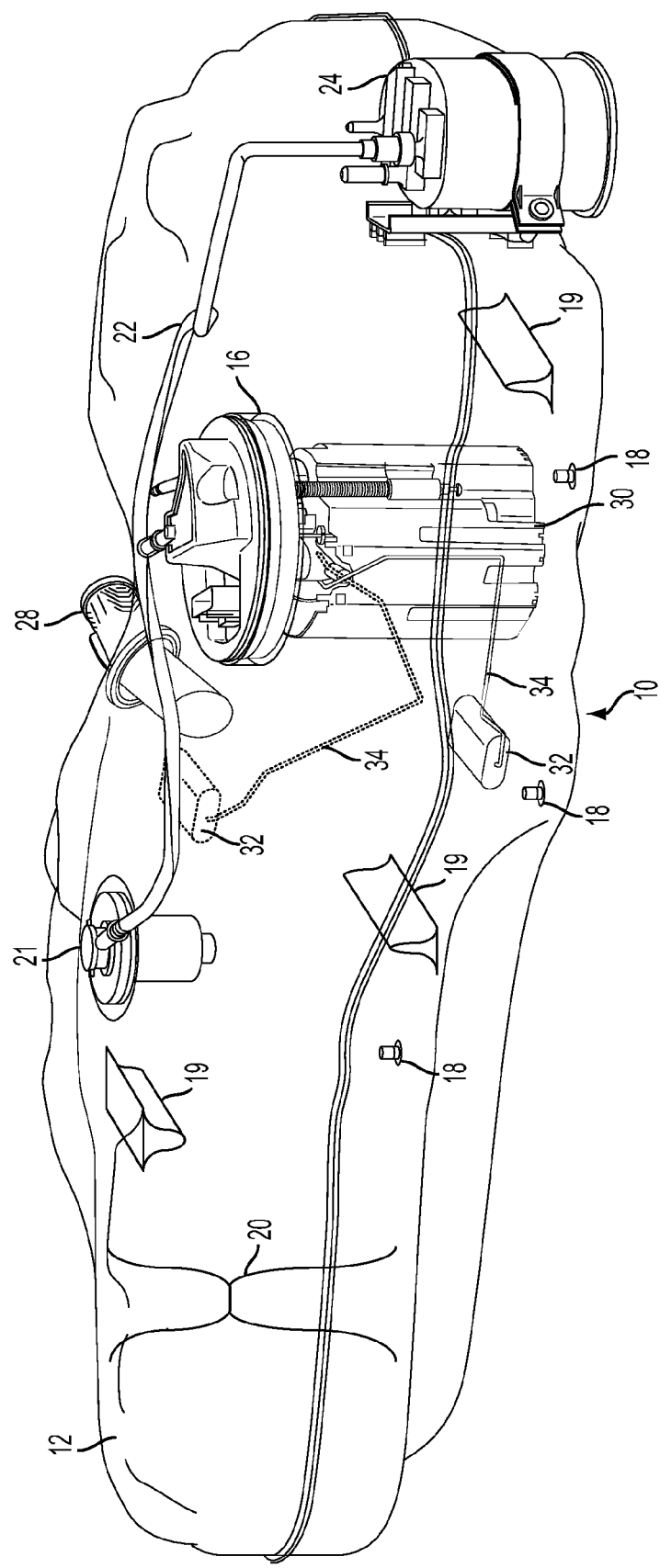
FIG. 2 shows a depiction of the fuel tank of FIG. 1 with a fuel delivery module engaged to the support domes.

Turning now to the figures, FIGS. 1 and 2 show therein side views 10 of example fuel tank 12, where FIG. 1 shows fuel tank 12 including an example of support domes 14 and FIG. 2 shows fuel delivery module 16 installed within fuel tank 12. The fuel tank may be formed of plastic that is molded into shape, for example blow molded to form the shape illustrated in the figures. With respect to FIG. 1, the support domes may be configured such that when the fuel delivery module is installed within fuel tank 12, the support domes 14 will engage directly and in face sharing contact with the bottom of the fuel delivery module and the components of the fuel level measurement module. It will be appreciated that while the disclosure describes the support domes engaging with the fuel delivery module including a fuel pump, various fuel tank inserts or components may utilize the support domes to ensure appropriate position and/or orientation within the fuel tank.

In one example, the support domes have conically shaped sides and a top surface. The top surfaces of each of the three example domes may all be parallel with one another and lie in a common plane. In one example, the surfaces are flat, although they may also have some surface irregularities to increase friction between the top surfaces and the flat bottom of the insert that rests upon and is supported by the three domes when installed (see FIG. 2). In an alternative example where the bottom of the insert is not flat (for example it may be stepped, see FIG. 7), at least the three top surfaces of the dome may be at different heights to define at least three interface points located with sufficient accuracy to support the insert at a desired location.

In one example, only three domes support the insert in a first region, while three or less domes support a movable component of the dome, such as a float. For example, the insert may have only two components that are movable with respect to one another via a rotary joint. In this case, a first component of the insert (e.g. a main component having the fuel pump) may be supported by only three domes, while the second component (e.g., a float), is supported by another, separate, set of three or less domes.

Additionally, it will be appreciated that support domes 14 comprise unbroken portions of the bottom surface of fuel tank 12, such that the support domes do not include a hole or gap that would require measures be taken to prevent fuel leakage.

Fuel tank 12 additionally may include at least some of the following: installation opening 16 for introducing and securing fuel tank inserts, such as the fuel delivery module, fuel port 28 for adding fuel to the fuel tank, fuel line 22 for transporting fuel vapor to carbon canister 24 to store hydrocarbons and vents valve 21 for managing fuel vapor pressure and fuel fill level shutoff within the fuel tank. Additionally, fuel tank 12 may include: bracket-mounting posts 18 for securing the outside of the fuel tank to the frame of the vehicle, fuel tank baffles 19 for mitigating wave sloshing action in the fuel present in the fuel tank, and molded columns 20 for stiffening the body of the fuel tank. Fuel tank baffles 19 may be formed on the bottom and/or top interior surface of the fuel tank. Molded columns 20 may be formed by indenting the top and bottom surfaces of the fuel tank until the two surfaces meet.

FIG. 2 shows the second side view 10 of fuel tank 12 represented in FIG. 1, including fuel delivery module 30 engaged to the support domes and secured in a desired position by installation opening 16. Fuel level measurement components are included in fuel delivery module 30, such as float 32 and arm 34. Float 32 may be configured such that the float possesses at least a minimum buoyancy to remain at the top level of a large range of fuel quantities within fuel tank 12. Arm 34 may be configured to rotatably couple float 32 to fuel delivery module 30, to guide the motion of float 32, and to indicate at fuel delivery module 30, by the position of arm 34, the height of float 32 above a resting position, where the resting position is defined as where float 32 is located when fuel tank 12 is empty of fuel. The resting position may be located at the flat-top of a support dome. It will be appreciated that the illustrated arm and float fuel level measurement components are not limiting and fuel level measurement may be accomplished by other means, including differential pressure sensors and any other suitable mechanism.

The domes may be integrally molded in the fuel tank walls and be of the same continuous material as the full wall of the fuel tank.

Figure 3:
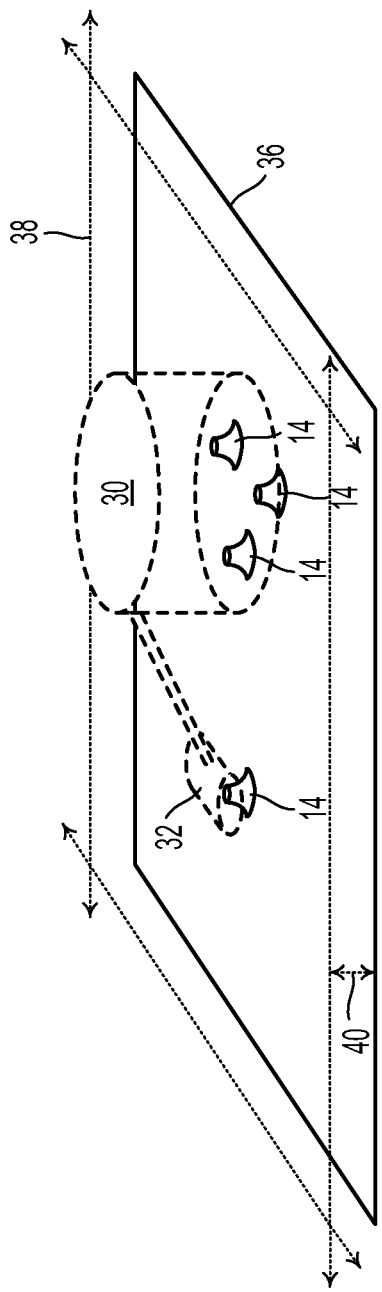
FIG. 3 shows a depiction of a fuel delivery module interfacing with the support domes of FIG. 1 in a common plane.

FIG. 3 shows a depiction of fuel delivery module 30 interfacing with the example of support domes 14 from FIG. 1. The support domes 14 may be configured such that three support domes are utilized to engage with fuel delivery module 30. An additional support dome may be utilized to engage with float 32 in the present example, corresponding to a resting position for the float. It will be appreciated that the number, arrangement and/or dimensions of the illustrated support domes are not limited by this disclosure. In the present example, only the four above described support domes 14 are included.

In the present example, support domes 14 are formed from a portion of internal tank bottom surface 36. Support domes 14 are configured such that the base of fuel delivery module 30 is parallel relative to a reference plane represented by x-y plane 38, which is average height 40 above internal tank bottom surface 36. X-y plane 38 may be configured to ensure that a stable, accurate fuel level measurement can be taken. Such configuration may result in x-y plane 38 being perpendicular to the force of gravity on the fuel tank while the vehicle is at rest on a level surface.

It will be appreciated that configuring the base of fuel delivery module 30 to be parallel to x-y plane 38 will result in the body of fuel delivery module 30 being perpendicular to x-y plane 38. In the case that the base of fuel delivery module 30 is not flat, the relative heights of support domes 14 may be different in order to maintain the perpendicularity of the body of fuel delivery module 30 to x-y plane 38. For example, if a given fuel delivery module has a base that has multiple levels offset from one another, the height of each of the support domes would be positioned to engage with the portion of the base that corresponds to the relative location of the support dome without preventing each of the other support domes from engaging with the base of the module, such that the fuel delivery module is maintained perpendicular to the x-y plane or another defined plane relative to a vehicle frame and/or gravity (which is vertical in the example of FIG. 3), for example.

FIGS. 4, 5 and 6 show side views of an example configuration of support domes 14. Specifically, FIG. 4 shows three support domes 14 on an irregular bottom surface of the fuel tank, the support domes being integral with the bottom surface and having a common, continuous, and un-interrupted material with the bottom of the fuel tank without any seams or adjacent surfaces therebetween. Each of the support domes 14 has a substantially flat top that is aligned with the other support domes, so that collectively they achieve the required parralellism tolerance to a datum reference. The domes, in essence, define a common plane such that the common plane is parallel to the surface of the fuel when the vehicle in question is on a level surface. Height difference 42 illustrates that in the present example, the substantially flat top of the support domes 14 is higher than the surrounding surface of fuel tank 12.

Zoomed portion 44 shows a magnified portion of the bottom surface of fuel tank 12. Specifically, zoomed portion 44 shows a height of a first portion 46 compared to a height of a second portion 48. A height difference 50 between the first portion and the second portion illustrates a typical variability in control over the fuel tank surfaces. Attempting to engage fuel delivery module 30 with the bottom surface of fuel tank 12 possessing variability, such as height difference 50, may cause the module to be installed tilted. As the fuel delivery module 30 includes fuel measurement components 32 and 34, a tilt in the orientation of the fuel delivery module may cause float 32 and arm 34 to indicate unintended, or inaccurate, fuel level information.

In some embodiments, the support domes 14 are formed by mechanically deforming the bottom surface of fuel tank 12 according to the appropriate configuration, however, the support domes may also be formed by modifying the fuel tank mold or any other appropriate method. Additionally, it will be appreciated that the support dome 14 configured to engage with float 32 may be formed at the same or a different height than the support domes 14 configured to engage with the fuel delivery module 30.

FIG. 5 shows three support domes 14 on a surface utilizing sumps 52. The sumps 52 may be configured such that the depth of the sump relative to the average height of the interior tank bottom surface may be greater than, less than, or equal to the height of the support domes. In contrast to FIG. 4, the example sumps 52 of FIG. 5 are depicted as deeper than the height of the corresponding support domes 14, allowing a fuel tank insert to potentially engage with the domes below the average bottom surface of fuel tank 12. This is made possible by ensuring the bottom perimeter of the body of the engaged module or components does not exceed the lateral dimensions of the sump 52.

FIG. 6 shows three support domes 14 on a surface utilizing a single well 54, similarly to FIG. 5. Well 54 may be configured such that the depth of the well relative to the average height of the interior tank bottom surface may be greater, less than, or equal to the height of the support domes, provided that the tops of support domes 14 are the highest points within well 54. If the depth of the well 54 is greater than the height of the tops of support domes 14, the dimensions of the well depend on the dimensions of the base of the engaged component.

As described above, one example embodiment may include a method of forming a fuel tank, comprising: modifying a bottom surface of a fuel tank in a first region to include a plurality of flat-topped support domes such that a fuel tank insert is aligned with a common plane defined by the support domes. The bottom surface, including the domes, may be molded in a single blow molding process. After the molding process, the flat tops only (as opposed to other surfaces of the fuel tank) may be machined to form a common plane of higher accuracy. Or alternatively the flat tops could be made more flat by using a heating device to melt the dome tops. The bottom surface may further includes a second region below a float, the second region including at least one flat-topped support dome further defining the common plane. The float may be rotatably coupled to the fuel tank insert, a bottom surface of the float shaped to rest on the flat top of the support dome in the second region. The bottom inner surface may includes sumps, and the plurality of flat-topped support domes may be located within the sumps, the bottom surface of the fuel tank being more irregular than the flat top of the flat-topped support domes. Alternatively, the plurality of flat-topped support domes may be formed by mechanically deforming the bottom surface of the fuel tank after the blow molding process, the support domes being integral with the bottom surface of the fuel tank and having a common, continuous, and un-interrupted material with the bottom of the fuel tank without any seams or adjacent surfaces therebetween. The mechanical forming process may stress the side walls in the bottom region of the domes.

In one example a fuel tank for an on-road vehicle comprises a bottom inner surface including a first region below a fuel tank insert, the bottom inner surface including a plurality of flat-topped support domes defining a common plane. Each of the support domes may have a top surface that is parallel with each other top surface of the other support domes and the common plane, and further wherein the bottom surface further includes a second region below a float, the second region including at least one flat-topped support dome further defining the common plane. The float may be coupled to the fuel tank insert, and wherein the fuel tank insert includes a fuel pump, where all of the top surfaces are flat tops of the flat-topped support domes and are parallel with one another and in the common plane. The float may be rotatably coupled to the fuel tank insert with a single degree of freedom, a bottom surface of the float shaped to rest on the flat top of the support dome in the second region. The bottom inner surface may include sumps, and where the plurality of flat-topped support domes are located within the sumps, the bottom surface of the fuel tank being more irregular than the flat tops of the flat-topped support domes. Further, the plurality of flat-topped support domes may be formed by mechanically deforming the bottom surface of the fuel tank. The support domes may be integral with the bottom surface of the fuel tank and having a common, continuous, and un-interrupted material with the bottom of the fuel tank without any seams or adjacent surfaces therebetween. The plurality of flat-topped support domes may be formed by melting the dome tops with a heating device. The plurality of flat-topped support domes may be configured, for example shaped to prevent the fuel tank insert from contacting the bottom surface such that when installed, there is a gap of unfilled space fully between a bottom external surface of the insert and a top of the bottom inner surface of the fuel tank, without any other components therebetween. A bottom-most surface of the fuel tank insert may rest on only the flat-topped top surfaces of the support domes only in the first region, and wherein the bottom-most surface of the fuel tank is spaced away from the inner surface of the fuel tank bottom, the first region directly below a fuel tank opening. The common plane may be defined by the plurality of flat-topped support domes is parallel to a fuel surface when a vehicle including the fuel tank is on a level surface and filled with fuel, the fuel tank further comprising one or more baffles, separate from the support domes, on the bottom surface and spaced away from below the fuel tank insert.

Figure 7:
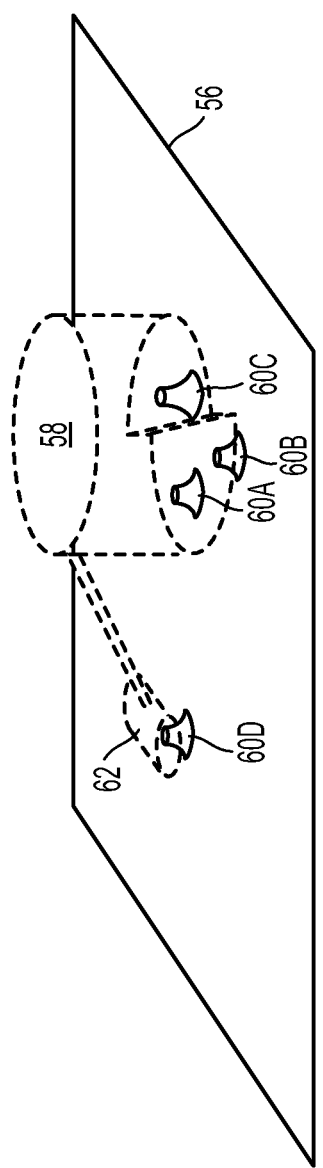
FIG. 7 shows a depiction of a fuel delivery module interfacing with the support domes of FIG. 1 at varying heights.

As illustrated in FIG. 7, the example fuel tank may comprise a bottom inner surface 56 including a first region directly below a bottom surface of a fuel tank insert 58, the bottom inner surface including exactly three support domes (60A, 60B, and 60C) spacing the insert bottom away from the fuel tank bottom inner surface, the three support domes directly contacting the bottom surface of the fuel tank insert 58. The three support domes locate the insert relative to a defined position, the insert including a fuel pump and the insert not being supported by any other protrusion or surface of the fuel tank bottom, the tank further including at least another support dome 60D located below a rotatable component 62 of the insert and spaced away from below the insert bottom surface. The three support domes may each have a top surface parallel with one another and defining a common plane, and wherein the insert bottom surface is coincident with the common plane. Alternatively, the three support domes may each have a top surface offset with one another and matching an offset of the insert bottom surface resting thereupon. The offset may include multiple offsets at multiple locations such that each of the domes top surfaces, while parallel with one another, may each be at a different height although each still directly engaging and supporting the bottom surface of the insert. Still further, the top surfaces of the domes may not be parallel with one another and may be a single point. In this way, even an uneven and offset bottom surface of an insert may be accommodated and located precisely in the fuel tank relative to one or more other components and/or movable portions of the insert.

It will be appreciated that the configurations and routines disclosed herein are exemplary in nature, and that these specific embodiments are not to be considered in a limiting sense, because numerous variations are possible. For example, the above technology can be applied to fuel tanks holding various fuel types. The subject matter of the present disclosure includes all novel and non-obvious combinations and sub-combinations of the various systems and configurations, and other features, functions, and/or properties disclosed herein.

For example, in another representation, a plastic fuel tank mounted in an over-the-road vehicle for holding liquid fuel may comprise a bottom plastic inner surface including a first region below a fuel tank insert, the bottom inner surface including a plurality of flat-topped support domes defining a common plane, wherein the plurality of support domes are configured to prevent the fuel tank insert from contacting the bottom surface, the bottom surface further including a second region below a float, the second region including at least one flat-topped support dome further defining the common plane. The float may be rotatably coupled to the fuel tank insert, a bottom surface of the float shaped to rest on the flat top of the support dome in the second region, the bottom surface further including one or more baffles not positioned below the insert and not positioned below the float. The main portion of the insert may be supported from the bottom only by the three support domes in the first region, and the float supported from the bottom only by the at least one or more other domes in a second region. The main portion of the insert may also be supported from sides or a top that does not restrict the downward movement of the inserts, such that each of the three support domes maintains direct contact with the bottom surface of the insert when installed in order to maintain accurate location of the insert and related rotationally coupled components of the insert relative to one another. Further, there may be a gap not filled with any other components between the bottom surface and the bottom inner fuel tank surface, other than the domes. The gap may be filled with liquid fuel when the tank includes liquid fuel.

The plurality of flat-topped support domes may be formed integrally in the bottom surface of the fuel tank including stressed and deformed bottom portions, the support domes being integral with the bottom surface of the fuel tank and having a common, continuous, and un-interrupted material with the bottom of the fuel tank without any seams or adjacent surfaces therebetween. In one example, for each movable portion of the insert, a separate and distinct set of locating domes may be provided in order to locate the overall insert, each set directly engaging respective movable portions of the same insert. In the example of a single rotable element, such as the float, two regions of domes are included in the fuel tank.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel tank, comprising:
a bottom inner surface including:
a first region, directly below a fuel tank insert, including a plurality of flat-topped support domes integral with the bottom inner surface which define a common plane and prevent the fuel tank insert from contacting the bottom inner surface; and
a second region, directly below a float, including at least one flat-topped support dome which is separate and distinct from the first region support domes,
wherein the fuel tank insert is supported from the bottom only by the flat-topped support domes of the first region, and wherein the float is supported from the bottom only by the at least one support dome of the second region.

2. The fuel tank of claim 1, wherein the at least one flat-topped support dome of the second region further defines the common plane.

3. The fuel tank of claim 2, wherein the float is rotatably coupled to the fuel tank insert, a bottom surface of the float shaped to rest on the flat top of the at least one support dome in the second region, the bottom inner surface further including one or more baffles extending taller than each and every one of the flat-topped support domes of the first and second regions.

4. The fuel tank of claim 1, wherein the flat-topped support domes of the first and second regions are formed by mechanically deforming the bottom inner surface, the flat-topped support domes of the first and second regions having a common, continuous, and un-interrupted material with the bottom inner surface without any seams or adjacent surfaces therebetween.

5. A fuel tank, comprising:
a bottom inner surface including a first region directly below a fuel tank insert bottom surface, the first region including a plurality of support domes which are integral with the bottom inner surface and space the fuel tank insert bottom surface away from the bottom inner surface, wherein top surfaces of the plurality of support domes directly contact the fuel tank insert bottom surface, wherein the fuel tank insert bottom surface has multiple levels offset from one another, and wherein the top surfaces of the support domes are at different heights and an offset between the heights of the top surfaces of the support domes matches the offset of the multiple levels of the fuel tank insert bottom surface.

6. The fuel tank of claim 5, wherein the support domes locate a fuel tank insert relative to a defined position, the fuel tank insert including a fuel pump and the fuel tank insert not being supported by any other protrusion or surface of the bottom inner surface, the fuel tank further including at least another support dome located directly below a rotatable component of the fuel tank insert and spaced away from the first region.

* * * * *